Figure 1A:
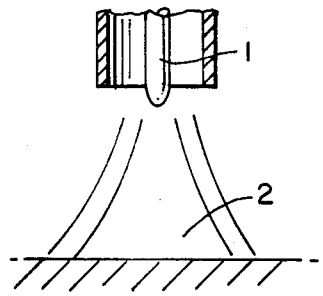

United States Patent [19]

Wang

[11] Patent Number: 4,678,718

[45] Date of Patent: Jul. 7, 1987

[54] PROCESS AND USAGE OF CERIATED TUNGSTEN ELECTRODE MATERIAL

[75] Inventor: Ju-Zhen Wang, Shanghai, China

[73] Assignee: Shanghai Lamp Factory, Shanghai, China

[21] Appl. No.: 771,743

[22] Filed: Sep. 3, 1985

[30] Foreign Application Priority Data

Apr. 1, 1985 [CN] China .................................. 85100484

[51] Int. Cl.$^4$ ............................................... B22F 7/04
[52] U.S. Cl. ..................................... 428/560; 72/274;
72/286; 72/378; 219/145.21; 219/146.21;
219/146.22; 219/146.31; 419/4
[58] Field of Search ................... 428/560; 219/145.21,
219/146.21, 146.22, 146.31; 72/274, 286, 378;
419/4

[56] References Cited

U.S. PATENT DOCUMENTS

| | | | |
|---|---|---|---|
| 2,744,183 | 5/1956 | Conant | 219/8 |
| 2,825,703 | 3/1958 | Conant | 252/515 |
| 4,213,027 | 7/1980 | Bykhovsky et al. | 219/121 P |
| 4,229,873 | 10/1980 | Bykhovsky et al. | 419/20 |

OTHER PUBLICATIONS

V. N. Romanova et al, The Effect of Various Additives on the Properties of Tungsten, Sep. 1969, pp. 1–12.
D. M. Rabkin et al, The Effect of Oxide Additives of Certain Rare Earth Metals on the Properties of Tungsten Electrodes, 1964, Electric Welding Inst., pp. 5–9 and translation.
I. Y. Kondratov et al, Thermoemission of Alloys of Tungsten-Rare Earth Metal Oxide, 1967 USSR Academy of Sciences, No. 9(57), pp. 79–83 and translation.

*Primary Examiner*—Stephen J. Lechert, Jr.
*Attorney, Agent, or Firm*—Pennie & Edmonds

[57] ABSTRACT

The mentioned ceriated tungsten material is a non-radioactive, hardly consumable or nonconsumable matallic electrode material, utilized in the inert gas shield arc welding, plasma welding, cutting, spray coating and smelting. It can also be used as electrodes for laser transmitting source and gas discharging light source. Moreover, the said material can be utilized to make as the cathodic filament used in film deposition by electronic beam under vacuum, etc. This invention employs the technique of powder metallurgy, by strictly controlling the processing parameters to fabricate the ceriated-tungsten material, containing 1.0–4.5%* ceric oxide. Thereby, the difficulties, that had been existed for quite a long time of its processing brittleness in forging the ceriated tungsten material over 1.0%, have now been satisfactorily overcome.

* ceric oxide = ceria

13 Claims, 6 Drawing Figures

PROCESS AND USAGE OF CERIATED TUNGSTEN ELECTRODE MATERIAL

This invention proposes a fabricating process for a kind of non-consumable electrode material and its usage.

In the past time, the tungsten electrode material used in the inert gas shield arc welding contained (1-2%) thorium oxide as an additive. The addition of the thorium did improve its contamination and its loss. Moreover, the welding performance of arc inducing voltage and arc starting loss was much better than that of pure tungsten electrode material. Furthermore, the lifetime of the electrode was comparatively prolonged. Nevertheless, the disadvantage was that of production of radioactive contamination, surrounding the welding area, causing by the existence of the accompanied thiorium and thorium oxide, which was harmful to human health. A U.S. Pat. No. 2,744,183 was filed in Nov. 13, 1952 and approved in May 1, 1956 by the U.S. Patent and Trademark Office. The patent proposed a kind of inert gas shield arc welding electrode material for "Inert Gas Shield Arc Welding". Its main composition was tungsten containing 2-10% several kinds of additives i.e. it contained at least two kinds of oxides selected from any of the barium oxide, calcium oxide, cerium oxide and yttrium oxide. Another U.S. Pat. No. 2,825,703 was filed in Dec. 6, 1955 and approved in Mar. 4, 1958 by the U.S. Patent and Trademark Office. This said patent headed "Tungsten Arc Electrode" proposed a kind of non-consumable inert gas shield arc welding electrode. The electrode composed mainly of tungsten with a small amount of about 0.01-0.30% cerium oxide as an additive. Also it was pointed out that the additive should not be added too much, for otherwise the material would become too brittle to be rotary forged.

AD699650 "The Effect of Various Additives on the Properties of Tungsten" was published in Nov. 13, 1969. This information was taken from a research study headed "Metallurgy of Tungsten, Molybdenum and Niobium" written by the Metallurgical Institute of the Soviet Academy, issued in "Science" Moscow, 1967 page 142-149. This study pointed out that the heat emitting feature of tungsten containing 1.0% cerium oxide was lower than that of the thoriated tungsten material.

The inventor had provided an opinion, and handed over by the Chinese Representative to ISO in 1980. The inventor, by then, had proposed a ceriated tungsten material, composed of weight proportion of $\leq 2\%$ ceric oxide, and had suggested to be listed into the ISO/TC Standard of "The Tungsten Electrodes For Inert Gas Welding and Plasma Welding and Cutting". And that was passed as a draft DP 6848.

In the previous fabricating process for the gas discharging tube and vacuum devices, the pure tungsten rod or thoriated tungsten rod were used as inducing wire material in seal-joining with the 95 raw glass (3C11). In addition to the existence of some sort of its harmful effect of radioactivity, it, further, had remained the problems of reliability of its seal-joining quality and its low rate of acceptability.

The object of this invention is to propose a kind of ceriated tungsten electrode material with its fabricating process and usage, in order to solve the above mentioned technical problems; namely:

(1) To eliminate the environmental contamination of radioactivity by the thoriated tungsten electrode during its fabricating and using stage;

(2) To improve the electronic emitting power of the electrode tungsten over its usage in inert gas arc welding and plasma welding, cutting spray coating and smelting; so that the needs for the enhanced technical performance in the electrode using field can be satisfied.

(3) To improve the technical performance of the electrode tungsten, utilized in the laser transmitting source and gas discharging light source.

(4) To improve the technical performance of the cathodic filament used in film deposition by electronic beam under vacuum.

(5) To improve the technical performance of the gas discharging tubes and vacuum devices, made up by utilizing 95 raw glass (3C11).

(6) To solve the problem of brittleness, encountered in the processing of ceriated tungsten material containing $>1.0\%$ ceric oxide.

A kind of non-consumable electrode material, proposed by this invention, is a tungsten based ceriated tungsten material, the weight proportion of which is 2-4.5% cerium oxide. Thereby, not only there exists no harmful effect of radioactivity over its contaminated environment, but on the contrary, the heating emitting power of the new material is comparatively better than that of the thoriated tungsten material. Moreover, the advantageous result would be far outstanding when the cerium oxide content is 3.0-4.5%. The practical experimental result had shown that the doses of $\alpha$ radioactivity of the thoriated tungsten material, containing 2% thorium oxide, amounted $3.64 \times 10^{-5}$ Curie/kg, while the ceriated tungsten material, containing 2-4% ceric oxide was only $24.2-7.4 \times 10^{-9}$ Curie/kg; the work function of thoriated tungsten which contains 2% thorium oxide was 4.4 ev, while the ceriated tungsten which contains 2% cerium oxide was only 3.1 ev (after activated). The results of experiments had thus proved that the electronic emitting power of the non-radioactive ceriated tungsten electrode material was comparatively better than that of the radioactive thoriated tungsten electrode material.

This invention proposes a kind of powder metallurgy process in fabricating the ceriated tungsten material containing cerium oxide, by weight proportion of 1.0-4.5%; thereof the brittleness existed in forging the material can be overcome. The details of the fabricating processes are: Calculate the weight percent of the cerium oxide needed to composite with tungsten trioxide and add the ceric salt into the tungsten trioxide. The salt solution is first evaporated dry and then, is calcinated. The composite powder is then reduced in a tubular furnace with hydrogen by two stages. The reduced ceriated tungsten composite powder is pressed into bar form ingot. After the ingot has finished presintering in a molybdenum wired furnace with hydrogen, it is again under hydrogen protection electrically sintered in a Bell-jar Sintering Furnace with highly elevated temperature, so as to obtain the metallic cerium bar. The bar is then rotary forged while hot and it should be intermittently annealed during forging. The bar is started to be drawn from less than 3 mm in diameter, in a gas heated furnace to any required diameter; annealing should be applied, when necessary, during the drawing procedure. The drawn product, either rod or wire, should now be aligned, cut, washed and ground to meet the requirements of product specification. The following technique parameters should be strictly controlled during the fabricating process: The amount of cerium (oxide) added to the tungsten trioxide should be calculated in such a way that only 88% of cerium oxide needed in ceriated tungsten electrode. The cerous nitrate solution is prepared accordingly. The additive solution is then carefully doped into an evaporating vessel containing heated and agitated tungsten trioxide. After evaporation, it is dried and calcinated under a temperature of 300°–800° C. The temperatures of two stage reduction in hydrogen tubular furnace are firstly under 750° C., and secondly under 900° C. The maximum grain size of ceriated tungsten powder is less than 8μ. The pressure required to press the bar is 1.5–3.5 ton/cm$^2$. The highest presintering temperature for the molybdenum wired furnace with hydrogen is 1250° C. The bar should be covered with a lid piece. Then the bar should be sintered in bell-jar sintering furnace under hydrogen protection. The sintering current under the high temperature should not exceed 85% of that of the cut-off fuse current, and it may be accomplished in one stage or two stages. The rotary forging from the original ingot bar to φ6.0 mm is carried out after it has been heated in a hydrogen protected molybdenum wired furnace. The rotary forging, from φ6.0 mm to finishing is executed after it has been heated in a gas fired furnace. The rotary forging temperature range from formation of the original ingot bar to finishing is 1750° C.–1200° C.; the temperature may be decreased as the diameter is getting smaller. The treating annealing should be added during the forging period. The furnace tube of the molybdenum wired furnace for the heating of the ingot bar for rotary forging should subject to coating treatment so that the difficulties effected in processing may be avoided.

The heating temperature in the gas fired furnace for under φ3.0 mm wire drawing, ranges from 1300° C. to 700° C., and it may be reduced as the wire diameter is getting smaller.

This invention proposes various applicable scope of the ceriated tungsten material containing 1.0–4.5% cerium oxide and the technical performances obtained by the said material are all far superior to that of the thoriated tungsten material. The practicable experimental results had indicated that when the ceriated tungsten material was utilized in inert gas shield arc welding, hydrogen atomic welding, argon arc deposit welding and pulse argon arc welding, etc., the purity of the inert gas required would be lower than that of the thoriated tungsten material. When it was utilized in the inert gas shield arc welding, plasma welding, cutting, spray coating, smelting and all other applicable scope of plasma arc, the ceriated tungsten electrode would possess higher arc compression, arc stability, higher reliability in repeated arc inducing and allowable current density. It also would possess the property of lowering the inducing arc current required and enlarging the cutting off gap; moreover, the service life would be increased many times. Under the utilizing condition of plasma arc welding, the end part of the electrode would possess 60 "Natural Tapering" special feature; the welding passes would be narrower and smoother; and the fusion pool would be deeper. Especially it is most suitable in the case of thin metal plate and long continuous welding.

In the plasma cutting, the cutting path would be narrower and more vertical, and smaller lag amount. When it was utilized in the plasma spray coating, the smoothness of the spray-coated surface would be enhanced and in the plasma smelting that the continuous smelting time would be improved. When it was utilized for the laser transmitting light sources of pulse xenon lamp, high capacity pulse xenon lamp, high power pulse xenon lamp, high repeated frequency xenon lamp, low repeated frequency xenon lamp and short pulse krypton lamp, there would be no leaking flash occurrence, and their service life would be increased in multiples. When it was utilized for the especial lighting source, such as long arc xenon lamp, eyebase photo fluorographic lamp, photo copy lamp, navigation lamp, airfield electronic-controlled run down lamp, airfield runway lamp, high pressure capillary mercury lamp, neon lamp and mercury xenon lamp etc., their service life would be increased also. Finally when it was utilized in the film deposition by electronic beam under vacuum, such as the film deposition of zirconium oxide, the cathodic filament would possess the advantage of larger electronic beam transmitting.

Figure 1B:
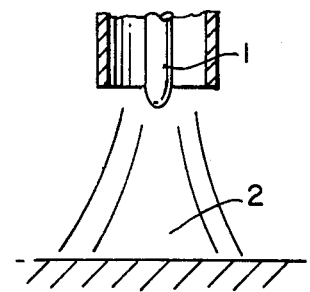

This invention will now further be described in details with the help of the attached drawings, figures and tables as follows:

FIG. 1 Comparison of compression degree of electrode arc zones of the ceriated tungsten electrode material and thoriated tungsten electrode material.

Figure 2:
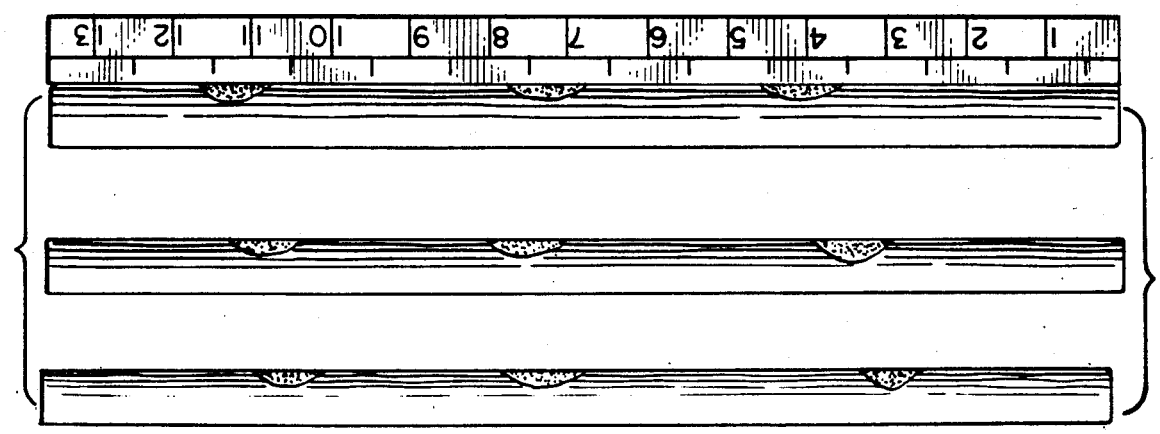

FIG. 2 Comparison of sectional arc welding fusion zone depth of the ceriated tungsten electrode and thoriated tungsten electrode.

Figure 3A:
Figure 3B:
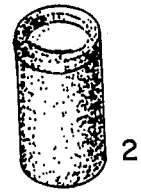

FIG. 3 Comparison of welding fusion degree of the thin-walled aluminium vessel, welded by ceriated tungsten electrode and thoriated tungsten electrode.

Figure 4A:
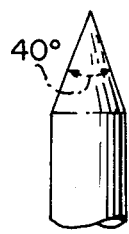
Figure 4B:
Figure 4C:

FIG. 4 Comparison of the shapes of electrodes of ceriated tungsten electrode and thoriated tungsten electrode, before and after their use in plasma cutting.

Figure 5A:
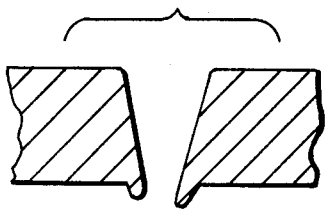
Figure 5B:
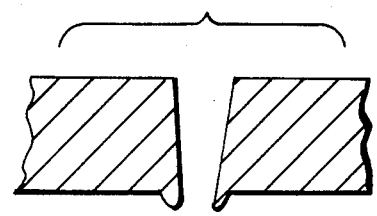

FIG. 5 Comparison of the cutting path shapes by the ceriated tungsten electrode and thoriated tungsten electrode plasma cutting.

Figure 6:
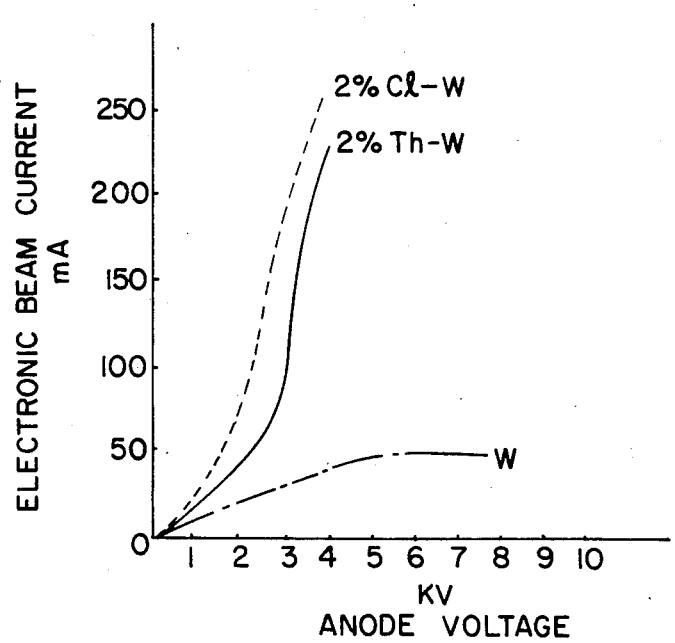

FIG. 6 Comparison of electronic beam current of different cathodic filament materials.

FIG. 1 shows the comparison of compression degree of electrode arc zones set by the ceriated tungsten electrode material and thoriated tungsten electrode material. The arc zone in the right hand illustration of FIG. 1 is set by the ceriated tungsten electrode, while the arc zone in the left hand illustration of FIG. 1 is set by the thoriated tungsten electrode. In the FIG. 1, is an electrode, and 2 is a bright zone. From the Figure it can be clearly seen that the ceriated tungsten has a narrower bright zone.

According to the Japanese Industrial Standard JIS Z3233-1976 "Tungsten Electrodes for Inert Gas Shield Arc Welding & Plasma Welding and Cutting", and International Standard ISO 6848 1984-12-15, their respective test specification for the thoriated tungsten material and technical specification for the ceriated tungsten material about the values of allowable current and electrode consumption can be compared as in the following table:

|  | Positive polarity | Anti-polarity |
|---|---|---|
| (1) Test Specification | | |

-continued

| | Positive polarity | | | Anti-polarity | | |
|---|---|---|---|---|---|---|
| 1 electrode size mm | φ 5.0 | | | φ 5.0 | | |
| 2 End shape of electrode | flat | | | flat | | |
| 3 Length of electrode extended over opening mm | 32 | | | 32 | | |
| 4 Length of electrode extended over shield cover mm | 3 | | | 3 | | |
| 5 Electrode, apart from workpiece mm | 6 | | | 6 | | |
| 6 Shield cover, inside Dia. mm | 16.3 | | | 16.3 | | |
| 7 Argon flow l/hr. | 9 | | | 9 | | |
| 8 Idling Voltage V | 71 | | | 70 | | |
| 9 Work-piece Material | Water-cooled braze anode | | | Water-cooled braze anode | | |
| 10 Welding Distance and workpiece position | Vertically set unmovable | | | Vertically set unmovable | | |
| 11 Arc inducing Form | high frequency | | | high frequency | | |
| 12 Arc inducing current A | 300 | | | 48 | | |
| 13 Arc Burning time min. | 20 | | | 20 | | |
| (2) Test Result | | | | | | |
| 1 Electrode material | 2% Th—W | 2% Ce—W | 4% Ce—W | 2% Th—W | 2% Ce—W | 4% Ce—W |
| 2 Working Current A | 500 | 500 | 500 | 80 | 80 | 80 |
| 3 Electrode Consumption after test g | 0.0166 | 0.0146 | 0.0131 | | | |
| 4 Arc Feature | | Stable | | arc unstable | not stable at beginning rather stable afterward | same as 2% Ce—W |
| 5 End part shape of Electrode After Test | | End part is still flat | | | End part become spherical shape | |
| (3) Test Conclusion | | | | | | |
| | 1. Only tested 500 A owing to the limit of the equipment  2. Consumption of 4% Ce—W is lowest 2% Th—W is highest | | | Arc stability of 4% Ce—W is most stable 2% Th—W is worst Length of electrode is not reduced after tested | | |

The other properties of different weight proportion of ceriated tungsten electrode material and thoriated tungsten electrode material had been comparatively tested and their results were as follows:

1. The Electrode Burn-off Loss Tests under Continuous Arcing:
i.e. the burn-off loss test of an electrode under long time arcing condition, once the arc induced.

| Tested Results: | | |
|---|---|---|
| Electrode Material | 2% Ce—W | 4% Ce—W |
| Electrode diameter | φ 2 mm | φ 2 mm |
| Working Current | 200 A | 200 A |
| Continuous time | 2 hrs. | 2 hrs. |
| Electrode Consumption | 0.3375 g | 0.3235 g |
| Burn-off rate comparing | 100% | 95.85% |

2. Comparative Tests of Minimum Inducing Arc Current:

The test was started from 0.5 A and the subsequent increase of inducing current was 0.5 A each step until the minimum inducing arc current had succeeded in triggering firstly. The idling voltage during test, was 6 V and the maintaining voltage was 14 V.

| Tested results: | | | |
|---|---|---|---|
| Electrode Material | | 2% Ce—W | 4% Ce—W |
| Electrode Diameter | | φ 2 mm | φ 2 mm |
| Minimum Arc | Flat End Part | 5 A | 3.5 A |
| Inducing Current | 20° Angular End | 1.5 A-2 A | 1 A |

3. Comparative Tests of Maximum Arc Cutting Off Gap Under Small Current:

The testing conditions were: The maximum arc cutting off gap indicated that the arc could be lengthened gradually under the minimum current of the stabilizing electric arc until the arc was cut off (by then, after cooling for one minute, and under the same gap, the arc could be re-induced and capable of maintaining several seconds, after then the arc cut off automatically).

| Tested results: | | | | | | |
|---|---|---|---|---|---|---|
| Electrode Size mm | φ 3.0 | | | φ 5.0 | | |
| Electrode material | 2% Th—W | 2% Ce—W | 4% Ce—W | 2% Th—W | 2% Ce—W | 4% Ce—W |
| Test Current A | 10 | 10 | 10 | 20 | 20 | 20 |
| Arc Cutting off Gap mm | 14.6 | 14.8 | 16.8 | 12.2 | 18 | 18.18 |

4. Comparative Tests of Reliability of Repeated Inducing Arc:

The testing conditions were: The electrical source was direct current of positive polarity and the end shape of electrode was flat, the inside diameter of the nozzle was φ14 mm and the length of electrode extended over the nozzle was 7 mm; the anode used was water cooled braze anode, and the distance between poles was 3.5 mm; the argon flow was 10 l/hr., the idling voltage was 65 V; the induced arc was high frequency triggered; the distance between the welding gun and anode was vertically secured. Each arc inducing test was counted as once, when the arc, induced under test was maintained 2 minutes and cut off for 2 minutes (four minutes for once). The argon gas was maintained to flow while the arc had been cut off. The test was repeated continuously for 50 times (altogether 50×4=200 minutes). The consumption values of the electrodes were then determined.

Tested results:

| Electrode Material | 2% Th—W | 2% Ce—W | 4% Ce—W |
| --- | --- | --- | --- |
| Electrode Diameter mm | $\phi$ 3 | $\phi$ 3 | $\phi$ 3 |
| Working current A | 300 | 300 | 300 |
| Arc Maintaining Voltage V | 13–13.5 | 12.5 | 12.5 |
| Amount of Electrode consumption g | 0.2426 | 0.1950 | 0.0653 |
| Consumption Contrast | 100% | 80.4% | 26.9% |
| Arc Inducing Stability | ** | Stable | Stable |

**After inducing arc 23 times it was not easy to induce arc. The arc could be re-established only after 3–4 times pressing with high frequency, but the arc was still irregular in aspect. The arc inducing was more difficult after 34 times, but it became regular after 40 times and its shape and aspect recovered normally.

5. Comparative Tests of Arc Welding fusion Zone Depth:

The test conditions were: The arc welding tests were carried out with positive polarity on a same stainless steel plate of 8 mm thickness. The welding rod was not used during tests. The steel plate sample was water cooled each time after the electrode material had finished every test, so that other kind of electrode material could be tested subsequently. The inside diameter of the nozzle was $\phi$14 mm and the distance between poles was 2 mm. The testing current was 255 A and the test voltage was 19.5 V. The welding speed was 310 mm/min. and welding length was 1.95M.

Tested Results:

| Electrode Material | 2% Th—W | 2% Ce—W | 4% Ce—W |
| --- | --- | --- | --- |
| Electrode Diameter | $\phi$ 4.0 mm | $\phi$ 4.0 mm | $\phi$ 4.0 mm |
| Stability of Welding Arc | Strictly agitating | stable | stable |
| Sectional Depth of Arc Welding Fusion zone | See FIG. 2 left side fusion depth | See FIG. 2 Medium Fusion depth | See FIG. 2 tight side fusion depth |

6. The Argon Arc Welding Tests of Thin Metallic Sheet and Long Length Thin Plate:

i. A small aluminium cylinder of $\phi$8 mm diameter and 0.8 mm wall thickness had been welded with electrode rod of $\phi$1.0 mm diameter and welding test result was shown in FIG. 3. On the left side of the Figure, the cylinder was fusion welded with 2% Th-W electrode after 20 A stabilizing arc, and on the right side of the Figure, it was welded by 2% Ce-W electrode after 15 A stabilizing arc.

ii. A platinum tube of $\phi$5 mm diameter and 0.25 mm wall thickness had been seal welded with electrode of $\phi$1.0 mm, and the test result was as shown in the following table:

| Item | 2% Th—W | 2% Ce—W | 4% Ce—W |
| --- | --- | --- | --- |
| 1 minimum Arc Inducing Current | 10 A | 9–10 A | 8 A |
| 2 Stabilized Arc Current | 19 A | 19 A | 12 |
| 3 Arc Length | only 3–4 mm can't be lifted up | When 12 A 5–8 mm | When 10 A 10 mm |
| 4 Welding Quality | Cannot be welded | Saw-toothed shape weld | smooth weld | iii. Compartive Welding Tests of 0.3 mm Thick Copper Long Belt: Firstly the test had been carried out with 2% Th-W, $\phi$2.0 mm electrode, using the welding current 82–84 A, voltage 19 V, speed 5.6 M/min and argon flow 4.8 ml/min. After welding 288 meters long, the result showed that the end part of the electrode was contracted apparently and welding zone showed dark brown color and 1.0 mm width. Secondly the test had been carried out with 2% Ce-W electrode to weld 436 meters long under the same condition and the test result had indicated that welding width was 1.3 mm and presented a golden color; and moreover the end part of the electrode had not been contracted apparently. When the quality of the weld had shown similar condition, the current of 2% Ce-W electrode would be decreased 10%.

7. Comparative Tests of Plasma Cutting:

The workpiece used in testing was 16 mm thick stainless plate (1Cr18Ni9Ti), and the diameter of the testing electrode was 5.2 mm. The idling voltage was 250 V and cutting current was 250 A. The tested results had shown that for 2% Th-W electrode, the consumption of electrode was 0.6 g after cutting a length of 3 meters; for 3% Ce-W electrode, the consumption of electrode was 0.31 gram after cutting a length of 18 meters. The shapes of electrodes before and after cutting was shown in FIG. 4, wherein (a) indicated the shape before cutting, (b) indicted the shape of Th-W electrode after cutting 16 mm thick 1Cr18Ni9Ti plate 3 meters long. (c) indicated the shape of 3% Ce-W electrode after cutting 16 mm thick 1Cr18Ni9Ti plate, 42 meters long and cutting 8 mm thick aluminium plate, 20 meters long; it was clearly shown that the end part of the electrode still possess the feature of "Natural Tapering", thus it could be put into use again.

Moreover, the cutting path of the Ce-W electrode was narrower than that of the Th-W electrode; and the cutting edges were more vertical as shown in FIG. 5, wherein (a) illustrates the cutting zone of the Th-W electrode and (b) illustrates cutting zones using Ce-W electrode.

8. Comparative Tests of "Double Arc" Current Tests occured in Plasma Cutting:

The tests had been carried out with $\phi$5 mm electrode, the end part of which was made taper-pointed 35° and its tip point was made 1.0 flat. The diameter of the nozzle was $\phi$3.5 mm. The length of electrode protruded out of fixture was 45 mm, and the distance between the nozzle and workpiece was 7 mm. The nitrogen supply maintained at 2.9 m³/h, and the test piece was 30 mm thick low carbon steel.

The uprising speed of testing current and cutting speed were as following:

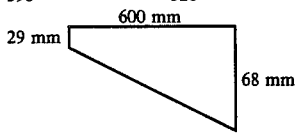

| Tested Results: | 2% Th—W | 2% Ce—W | 4% Ce—W |
|---|---|---|---|
| Electrode Material | | | |
| Electrode Diameter | 5.0 mm | 5.0 mm | 5.0 mm |
| "Double Arc" occurred Current A | 400 A occurred after cutting 260 mm long | 450 A not occurred after cutting 500 mm long | 450 A not occurred after cutting 500 mm long |
| The burnt off Diameter of tip point of Electrode after test mm | φ 2.6 | φ 1.9 | φ 1.6 |

9. Comparative Tests of Cutting Depth, Welding Width and Lag Amount of Plasma Cutting:

(The cutting depth listed herein is the cutting depth which is not cut-off penetrated through the workpiece.)

| | | | |
|---|---|---|---|
| 1 Electrode Size mm | ⌀5.5 | ⌀5.0 | |
| 2 End part shape of Electrode | taper angle 30° tip point flatted ⌀1 | taper angle 30° tip point flatted ⌀1 | |
| 3 Contract Inward of Electrode mm | 11.5 | 10 | |
| 4 Opening Diameter of Nozzle | 4.5 mm | 3.5 mm | |
| 5 Nitrogen flow m³/Hr | 2 | 2 | |
| 6 Distance between nozzle and workpiece mm | 7 | 27 | |
| 7 Idling Voltage V | — | 290 | |
| 8 Cutting current A | 380 | 375 | |
| 9 Cutting Voltage V | — | 185 | |
| 10 Cutting Speed mm/min. | 390 | 320 | |
| 11 Sample (aluminium plate) to be cut, size. The aluminium plate was 300 mm in width, other dimension as shown in the drawing. | 29 mm | | |

| Tested Results: | | | | |
|---|---|---|---|---|
| 1 Electrode Material | 2% Ce—W | 4% Ce—W | 2% Th—W | 2% Ce—W |
| 2 Electrode Diameter mm | 5.5 | 5.5 | 5.0 | 5.0 |
| 3 Cutting Depth mm | 54.5 | 57 | — | — |
| 4 Cutting Width | | | | |
| (positive) mm | — | — | 8.0 | 7.5 |
| (anti) mm | — | — | 5.5 | 5.0 |
| 5 Lag Amount mm | — | — | 20 | 14.8 |
| 6 Diameter of End Part after burn-off mm | — | — | 1.6 | 1.2 |

10. Comparative Tests of Plasma Spray-coating Testing Condition:

Gas Specifications: Argon Composition Ar 85.3%, N₂ 14.6%, O₂ 2 PPM. The purity for N₂ should be 99.9%, and for H₂ should be 98%; Nozzle ⌀8×32 mm; Electrode ⌀7.8 mm, Electrode protruded length 21 mm; Electrode distance apart 2 mm; High Frequency inducing arc (Argon flow 500 l/hr); The arc test did not spray powder, current 400 A; Power 28 Kw. The gas flow rate for N₂ was 2500 l/hr and for H₂ was 600 l/hr. The testing time was 20 minutes and temperature of inlet water was 18° C.

| Tested Results: Item | 2% Th—W | 2% Ce—W | 4% Ce—W |
|---|---|---|---|
| 1 Rate of Fluctuation of Arc Current. (Fluctuation Range of Arc Current) | 7.5-12.5% (30-50 A) | 2.5% (10 A) | 0.63% (2.5 A) |
| 2 The Spattering Condition of the Electrode in Arc | Occurred when Starting | Occurred after 15 minutes | Never occurred |
| 3 Electrode Burn-off Rate; Consumption Amount | 0.88 grams | 0.25 g | 0 |
| 4 Water outlet Temperature | 40° C. | 38° C. | 38° C. |

According to tested results that the quality of 4% Ce-W electrode is best. Thereby, the uniformity of plasma spray coating, protection from tungsten inclusion, and prolonging of continuous spray-coating can all be realized.

11. Comparative Tests of Ce-W electrode (Tungsten-Cerium) and Th-W electrode (Thoriated Tungsten) used for laser transmitting light source in highly repeated frequency xenon lamp:

Test conditions: lamp tube ⌀8×80 mm (seal jointed by transient glass), electrode ⌀7×50 mm (water-cooled by hollow jacket), input energy 90 joule (voltage 1350 V, capacitance 100 uf), working frequency 40 cycles/sec., peak current 2150 A, pre-igniting current 100-150 MA. The dropping speed of xenon lamp efficiency had been judged by using the overall light efficiency under continuous igniting in the laser transmitting device.

Tested results: The tested results had indicated that the output energy of the laser transmitting device decreased in multiples (due to the electrode spattering) after the 2% Th-W electrode had been put to use over 300,000 times; while the same device, made by 2% Ce-W electrode only dropped 4-12% after 10,000,000 times of usage, so the limit of service life was much higher than that of Th-W electrode, and moreover its light efficiency was increased by 10-15% more.

12. Comparative Tests of Starting Voltages Used in Repeated Frequency Xenon Lamp:

Test condition: Lamp tube $\phi 3.2\times 27\times 51$ mm, electrode $\phi 2.0$ mm, output energy 1.2 Joule, using repeated frequency. The tested results had indicated that the 4% Ce-W electrode used for the lamp was much superior under high gas pressure.

| Gas pressurized | Starting Voltage | |
|---|---|---|
| at Torr | 2% Ce—W | 4% Ce—W |
| 586 | 290 V | 270 V |
| 927.5 | 360 | 275 |
| 1050 | 390 | 290 |

13. Comparative Tests of the Film Deposition by Electronic Beam under Vacuum:

The tested results had indicated that when using $\phi 0.5$ mm filament to be the cathode of vacuum electronic beam in film deposition, the electronic beam current of the Ce-W electrode would be greater than that of the Th-W electrode, under the condition of 30 A filament current as shown in FIG. 6.

EMBODIMENT OF FABRICATING PROCESS

Fabrication of 2% Ce-W Electrode Material (1) Addition of Cerium Oxide into tungsten trioxide:

The additive is prepared according to the content of cerium oxide in the cerium nitrate. The cerium oxide, contained in the said solution, is chemically analyzed as 5.55% weight proportion concentration. Calculate the solution weight required to add into 50 Kg of tungsten trioxide.

$$\frac{50 \times 88\% \times 2\%}{5.55\%} = 15.856 \text{ Kg}$$

Put the 50 Kg tungsten trioxide into an evaporating vessel and dope the weighted 15.856 Kg of cerous nitrate solution into the vessel under the heated and agitated condition. After agitated, dried, calcinated, analyze the cerium oxide content in the tungsten trioxide, it should be 1.72%.

(2) Reducing:

Reducing is accomplished in 2 steps in a reducing furnace with hydrogen passing through it. The reduction is carried out in a furnace by putting the powder into a nickel boat which is pushed into the furnace in an anti-direction of the hydrogen flow. The maximum temperature for the 1st step should be 630° C. The maximum temperature for the 2nd step should be 880° C. The cerium oxide content in the powder should be 2.12%.

(3) Pressing into Bar Form Ingot:

The powder is pressed into a hydraulic press, under 2 opposite directional pressing into a bar form. The pressing pressure is 2.1 ton/cm². The pressed bar is then put onto a nickel boat. The boat is covered with lid piece and put into a hydrogen protected, molybdenum wired furnace for presintering. The temperature should not pass over 1200° C. and should be kept for 30 minutes.

(4) Sintering:

This process is carried out by putting the bar into an hydrogen protected bell-jar sintering furnace with water cooled jacket. The maximum holding temperature current is 2700 A. The cerium oxide content of the finished bar should be 2.05% when correctly chemical analyzed.

(5) Rotary Forging:

The rotary forging, from a square form ingot into $\phi 6.0$ mm bar is heated in a molybdenum wired furnace. The tube of the furnace is subjected to suitable coating treatment to prevent its brittleness. During the process, annealing should be implemented in the bell-jar sintering furnace once. The rotary forging from $\phi 6.0$ mm down to $\phi 2.75$ mm should be heated in a gas fired furnace. The rotary forging temperature in the furnace should begin from 1700° C. gradually down to finishing forging process temperature of 1300° C. The gradual decrease of temperature, of course, follows the stepping reduction of the bar diameter during rotary forging.

(6) Wire Drawing:

The process of wire drawing from $\phi 2.75$ mm down to, say $\phi 1.00$ mm is carried out under the heated gas fired furnace, beginning at a temperature of from 1300° C. gradually down to 1100° C. as the wire drawn to smaller diameter. Tests had shown that the wire may be drawn down to $\phi 0.4$ mm or under.

What is claimed is:

1. A process utilizing a powder metallurgical technique in forming a ceriated-tungsten electrode including the steps of
   (a) preparing a quantity of tungsten trioxide,
   (b) preparing a cerium nitrate solution,
   (c) adding a sufficient quantity of cerium nitrate solution to the tungsten trioxide to provide 1–4.5% by weight cerium oxide to the ceriated-tungsten electrode material,
   (d) drying and calcining the resulting mixture, then reducing the dried and calcined mixture in a reducing atmosphere,
   (e) pressing the reduced product into bar form,
   (f) presintering and sintering the bar under reducing conditions,
   (g) forging and annealing the bar,
   (h) preparing a wire by drawing the bar to a diameter of less than 3.0 mm, and
   (i) recovering the ceriated tungsten product.

2. The process of claim 1 wherein the dried and calcined mixture is reduced in a reducing atmosphere at a temperature of less than 750° C.

3. The process of claim 2 wherein the resulting mixture is reduced a second time in a reducing atmosphere at a temperature of less than 900° C., and wherein the tungsten powder obtained has a grain size of less than $8\mu$.

4. The process of claim 1 wherein the reduced product is pressed into bar form at a pressure of 1.5–3.5 ton/cm².

5. The process of claim 1 wherein said bar is presintered at a temperature of 1100°–1250° C., and said bar is sintered through a current not greater than 85% of a cut-off fuse current.

6. The process of claim 1 wherein the amount of cerium nitrate solution added to the tungsten trioxide is sufficient to provide 88% of the amount of cerium required by the ceriated tungsten product.

7. The process of claim 6 wherein the cerium nitrate solution is doped into the tungsten trioxide, and wherein the doped tungsten trioxide is dried and calcined at a temperature of 300°–800° C.

8. The process of claim 1 wherein the bar of substantially square outline is rotary forged at a temperature which decreases from 1750° C. to about 1300° C. as the bar of substantially square outline is formed to a rod of substantially round outline of about 3.0 mm.

9. The process of claim 8 including annealing the bar during rotary forging.

10. The process of claim 9 wherein the rotary forged bar is drawn at a temperature which decreases from 1300° C. to about 700° C. as the diameter of the bar is reduced to less than 3.0 mm, and including annealing the bar during drawing.

11. A non-consumable electrode material of a tungsten-base material formed by the powder metallurgical technique of the process of claim 1.

12. The non-consumable electrode material of claim 11 including 2–4.5% by weight cerium oxide.

13. The non-consumable electrode material of claim 12 including 3–4.5% by weight cerium oxide.

* * * * *